United States Patent [19]

Henot

[11] Patent Number: 4,951,138

[45] Date of Patent: Aug. 21, 1990

[54] METHOD TO REDUCE THE THROUGHPUT RATE OF A SEQUENCE OF DATA FOR ASSISTANCE IN THE RECONSTRUCTION OF AN ELECTRONIC PICTURE USING A SUB-SAMPLED SIGNAL

[75] Inventor: Jean-Pierre Henot, Thorigne, France

[73] Assignees: L'Etat Francais (CNET), Issy les Moulineaux; Telediffusion de France, Montrouge, both of France

[21] Appl. No.: 317,729

[22] Filed: Mar. 2, 1989

[30] Foreign Application Priority Data

Mar. 2, 1988 [FR] France .................................. 88 02650

[51] Int. Cl.⁵ ........................ H04N 7/12; H04N 7/01; H04N 7/18
[52] U.S. Cl. .................................. 358/133; 358/135; 358/140; 358/105
[58] Field of Search ............... 358/133, 138, 140, 141, 358/105, 135; 382/56

[56] References Cited

U.S. PATENT DOCUMENTS

| | | | |
|---|---|---|---|
| 4,485,401 | 11/1984 | Tan et al. | 358/188 |
| 4,542,411 | 9/1985 | Imanaka et al. | 358/133 |
| 4,633,325 | 12/1986 | Usubuchi | 358/133 |
| 4,731,664 | 3/1988 | Nishiwaki et al. | 358/133 |
| 4,772,947 | 9/1988 | Kono | 358/133 |

OTHER PUBLICATIONS

Collogue TVHD 87, Ottawa, Oct. 4-8, 1987, pp. 6.2.2-6.2.28, Analyse de Structures de Sous-Echantillonnage Spatio-Temporel d'un Signal TVHD en vue de sa Transmission dans un Canal MAC, P. Bernard, M. Veillard, CCETT-Rennes-France Sommaire.

Primary Examiner—John K. Peng
Attorney, Agent, or Firm—Kenyon & Kenyon

[57] ABSTRACT

A method provides greater reduction in the throughput rate and, at the same time, greater fidelity to the configuration of an HD source image. The method is applied to a multiprocessing system wherein, within the picture or picture image blocks, "neutral" processing mode picture elements are determined, namely picture elements capable of accepting, without discrimination, at least two distinct sub-sampling processing modes; and it is chosen to associate, with each of the neutral processing mode picture elements, the one of the neutral processing modes that enables an optimal reduction in the throughput rate of the assistance data.

11 Claims, 7 Drawing Sheets

METHOD TO REDUCE THE THROUGHPUT RATE OF A SEQUENCE OF DATA FOR ASSISTANCE IN THE RECONSTRUCTION OF AN ELECTRONIC PICTURE USING A SUB-SAMPLED SIGNAL

BACKGROUND OF THE INVENTION

1. Field of the Invention

The field of the invention is that of data compression, notably data for assistance in the reconstruction of an electronic image or picture from a subsampled signal.

The method according to the invention has been particularly designed with a view to the compression of data pertaining to high-definition television pictures, in order to transmit these pictures in channels with reduced pass-bands, for example, according to the D2MAC Packets standard.

A television picture is defined by a number of parameters which represent the spatial and temporal analysis of this picture (in particular, the number of pictures per second, the number of lines per picture and the number of points per line).

The pass-band needed to transmit a high-definition television picture may attain values of the order of 100 MHz.

Thus, to transmit these pictures on channels with reduced pass-bands, (for example, satellite channels having a pass-band of the order of 12 MHz), data compression techniques have to be applied to these pictures in order to obtain a reduction in the transmission throughput rate.

2. Description of the Related Art

There are several known types of picture sub-sampling techniques which enable compression of the transmitted data. For example, there is a known "method for the analysis of structures for spatio-temporal sub-sampling of a HDTV signal with a view to its transmission in an MAC channel" as described in the proceeding of the HDTV Colloquium 1987, Ottawa, 4th to 8th Oct., 1987, Volume 1, pp. 6.2.1. and ff (P. Bernard, M. Veillard, CCETT). In this prior art method of analysis, each picture of the sequence is divided into zones and each zone systematically undergoes three parallel processing modes in three distinct linear filters. Each filter provides for a different sub-sampling filtering operation. These different filtering operations correspond to a preferential filtering operation for still pictures, for moderately mobile pictures and for highly mobile pictures respectively. The outputs of the filters are then compared to the original source, and the best filtering is chosen to determine which of the compressed signals is effectively transmitted.

The throughput rate reduction techniques that are currently being developed are generally aimed at compressing the HD picture so as to obtain a transmission throughput rate that corresponds to a standard picture. In the case of so-called "compatible" sub-sampling, the sub-sampled picture signal transmitted may then meet with two distinct fates:
   either a display of the sub-sampled signal on a standard television receiver;
   or a reconstruction of a high definition picture from, firstly, the sub-sampled signal and, secondly, additional assistance data.

SUMMARY OF THE INVENTION

An object of the present invention is the processing of assistance data of this type so these items of assistance data are themselves compressed.

The method according to the invention can be applied to the "compatible" as well as the non-compatible sub-sampling techniques.

From the viewpoint of sub-sampling techniques, the throughput rate reduction method of the present invention applies to the above-mentioned linear filtering techniques as well as to other types of sub-sampling techniques such as motion-compensation techniques.

Figure 1:
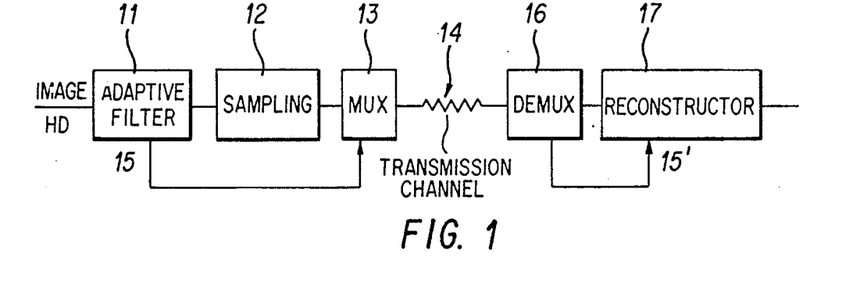
FIG. 1 shows a prior art system for the sub-sampling of an HD picture by adaptive filtering.
Figure 2:
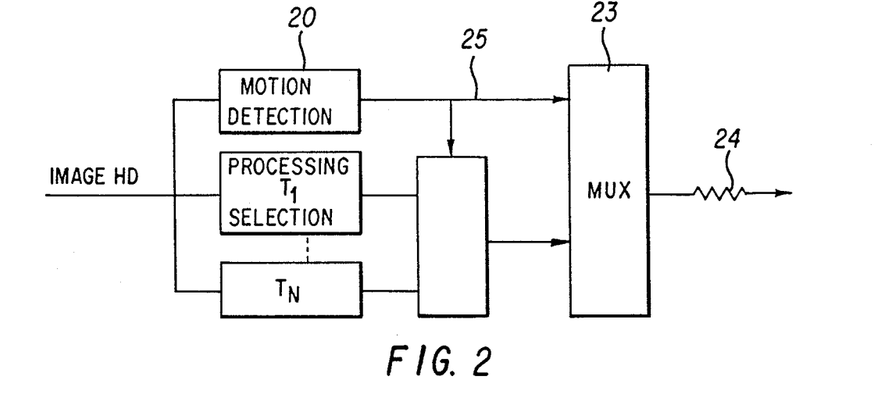
FIGS. 2 and 3 respectively show prior art systems for the sub-sampling of HD pictures, according to an a priori selection method and an a posteriori method, respectively, for the selection of several filtering-sub-sampling processing operations, T1 ... TN.
Figure 3:
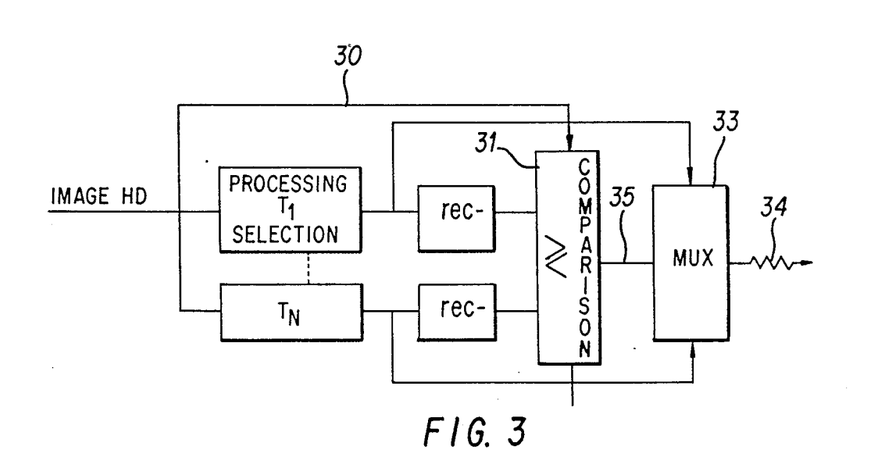

However, the method is more particularly designed for adaptive sub-sampling techniques wherein each point or block of points is sub-sampled in a preferential processing mode chosen from among several available types of processing modes. The assistance data is, in this case, formed by a piece of information associating, with each point or block of points, an indication of the preferred processing mode which is applied to it. Examples of adaptive sub-sampling techniques are shown in FIGS. 1, 2, and 3. FIG. 1 comprises a step 11 for adaptive filtering followed by a step 12 for sampling (re-sampling or sub-sampling proper) before the sampled signal is introduced into the transmission channel 14 via a multiplexer 13. In this embodiment, the assistance data 15 comprises items of data relating to the choice of processing mode, these items of data being determined during the adaptive filtering 11. These items of assistance data 15 are also sent into the transmission channel 14 through the multiplexer 13. They are then extracted, in the receiver, in the form of items of data 15', by a demultiplexer 16 in order to enable the reconstruction 17 of the HD picture.

The adaptive sub-sampling embodiments shown in FIGS. 2 and 3 respectively correspond to a processing selection system ($T_1 \ldots T_N$) which is done a a priori (according to a motion detection criterion 20; FIG. 2), and a posteriori according to a criterion of comparison 31 with the source HD picture 30; FIG. 3). The principle of these systems is described in greater detail, notably in U.S. patent application Ser. No. 284,390, filed on behalf of the same Applicants. In these embodiments, the pieces of assistance data 25, 35 also represent the selected processing mode, for each point or block of points of the picture, and are sent into the transmission channel 24, 34, through a multiplexer 23, 33.

There are known throughput rate reduction methods applicable to this type of assistance data.

Thus, most prior art systems propose to limit the throughput rate of processing selection data by freezing the size of the blocks of picture points in a dimension compatible with the width of the transmission channel. A fixed number of bits per block is then transmitted. This gives the receiver the modalities of reconstruction of the HD picture.

This type of system, which is general in the prior art, has the drawback of not being adaptive and therefore provides reconstruction quality with performance characteristics that are highly variable depending on the configuration of the picture.

It has also been proposed to reduce the throughput rate of the assistance data in reducing the temporal transmission of this data. In this case, it can be considered that the blocks of points on which the processing selection information is fixed are no longer two-dimensional blocks (within one and the same picture) but three-dimensional blocks (the third dimension being time, namely the taking into account of the projection of a block of points in several successive pictures).

This conception also comes up against the drawback wherein the compression of assistance data is not adaptive to the configuration of the picture because of the fixed nature of the blocks.

An object of the invention, notably, is to overcome these drawbacks of existing systems.

More precisely, a first object of the invention is to provide a method for the reduction of the throughput rate of assistance data for the reconstruction of an electronic picture from a sub-sample signal, the reduction being done according to an adaptive process for optimization of the data compression.

A complementary object of the invention is to provide a throughput rate reduction method, having both increased reduction performance and greater fidelity to the configuration of the HD source picture. Thus, the effort of adaptibility of the method according to the invention makes it possible to "stick" more closely to the different unit objects of the source image in enabling the homogenization, for each of these unit objects, of the processing undergone by all the points which represent it in the picture.

Another object of the invention is to provide a method of this type, the adaptive process of which is done according to a method for the exploration of pictures, and for decision on the processing of each point or block of points, optimizing the processing time.

Another object of the invention to make it possible to complete the reduction of the throughput rate by a step for optimizing the depiction of the reduced information, in the form of a quantification that provides for a new compression of the transmitted signal. The depiction process consists in the substitution of an information status identifier for the description of this information status, and in then recovering this description, at the receiver, in a dictionary addressed by the received identifier. This process, therefore, does not result in any loss of information.

Another object of the invention is provide a throughput rate reduction method which is compatible with a filtering process for the elimination of isolated blocks of points or points. The notion of an isolated zone implies that the zone in question is atypical and constitutes a minority in its environment from the viewpoint of the processing which has been associated with it as being an optimum one.

One of the essential aims of the invention is also to provide a method for the reduction of throughput rate of assistance data applicable to an mode for the sub-sampling processing of sequences of HDYV pictures so as to enable the transmission of the sub-sampled signals of pictures through a MAC type channel, notably by reducing the throughput rate of sub-sampled signals of assistance data to a maximum value of 1 Mbits/S.

These aims, as well as others which will appear subsequently, are achieved by means of a method for the reduction of the throughput rate of a sequence of data for assistance in the reconstruction of an electronic picture from a sub-sampled signal, notably a sequence of data for the selection of sub-sampling processing modes, associated with each picture element of a sub-sampled electronic picture, wherein the sub-sampling processing used for each picture element consists in choosing an optimum processing mode chosen from among several available processing modes tested in parallel, the efficiency of each processing mode being measured by a criterion of distortion of the processed signal with respect to the source signal, a method wherein, within the picture of picture image blocks, "neutral" processing mode picture elements are determined, namely picture elements capable of accepting, without discrimination, at least two distinct sub-sampling processing modes;

it is chosen to associate, with each of said neutral processing mode picture elements, those of said neutral processing modes that enable an optimal reduction in the throughput rate of the assistance data.

Advantageously, said step for the selection of picture elements accepting processing modes, according to the invention, consists in making a search, with respect to each picture element, for a set of processing modes, among the available processing modes, such that each of the processing modes, belonging to said set of "neutral" processing modes, meets both a condition of minimal distortion with respect to the other available non-neutral processing modes, and a condition of a distortion deviation, having a set threshold, with each of the other neutral processing modes.

Furthermore, in a preferred embodiment of the invention, said step for the choice of the optimum processing mode, for the neutral processing mode picture elements, consists in performing a hierarchical encoding on picture blocks of said picture, said picture blocks being formed by n.m picture elements, said hierarchical encoding process consisting in attempting, first of all, to select a single, representative processing mode which is unique for all the picture elements of said picture block by exploring all the processing modes acceptable by the neutral processing mode picture elements and then, if necessary, to divide block said by iteration until sub-blocks with single, representative processing are brought out therefrom.

According to the present invention, it is also possible to perform a filtering operation, on the picture, for the elimination of isolated picture elements, said filtering operation consisting in the sweeping of the sub-sampled picture with a mobile filtering window with a size of n×n picture elements and, preferably, 3×3 picture elements and in modifying the sub-sampling processing mode associated with at least one central picture element for each position on the picture of the mobile window, should the processing mode associated with said central picture element be different from a majority processing mode and/or a mean processing mode associated with the other picture elements within said window.

Advantageously, said filtering operation for the elimination of isolated blocks is performed before the operation for enforcing the choice of processing, for the neutral processing blocks.

BRIEF DESCRIPTION OF THE DRAWINGS

Other features and advantages of the invention will appear from the following description of preferred embodiments, given by way of illustration, and from the appended figures, of which:

FIGS. 7, 8, 9A, and 9B illustrate an advantageous embodiment to implement a sequential operation of the step for determining neutral elements, in the case of a sub-sampling system with three available processing modes;

DETAILED DESCRIPTION OF THE PRESENT INVENTION

The different aspects of the embodiment described below essentially correspond to the implementation of the method for reducing the throughput rate of assistance data, in an HD picture sub-sampling system with three available modes of processing.

Of course, the method according to the present invention is not restricted to an application of this type, and it is possible, without any difficulty, to envisage the application of the invention to sub-sampling systems having a different number of modes of processing.

The three processing modes available are, for example, linear filtering processing modes. In a case of this type, the assistance data may advantageously consist of simple identifiers of the processing modes, associated with each point or block of points that has become homogeneous after application of the method according to the invention. For example, these identifiers will be referenced, for each homogeneous picture element, in the form $f_1$, $f_2$, $f_3$ wherein $f_1$, $f_2$, $f_3$ each represent one of the three processing modes available, in the form of an information bit capable of assuming the value 0 or 1 (see further below).

Figure 4:
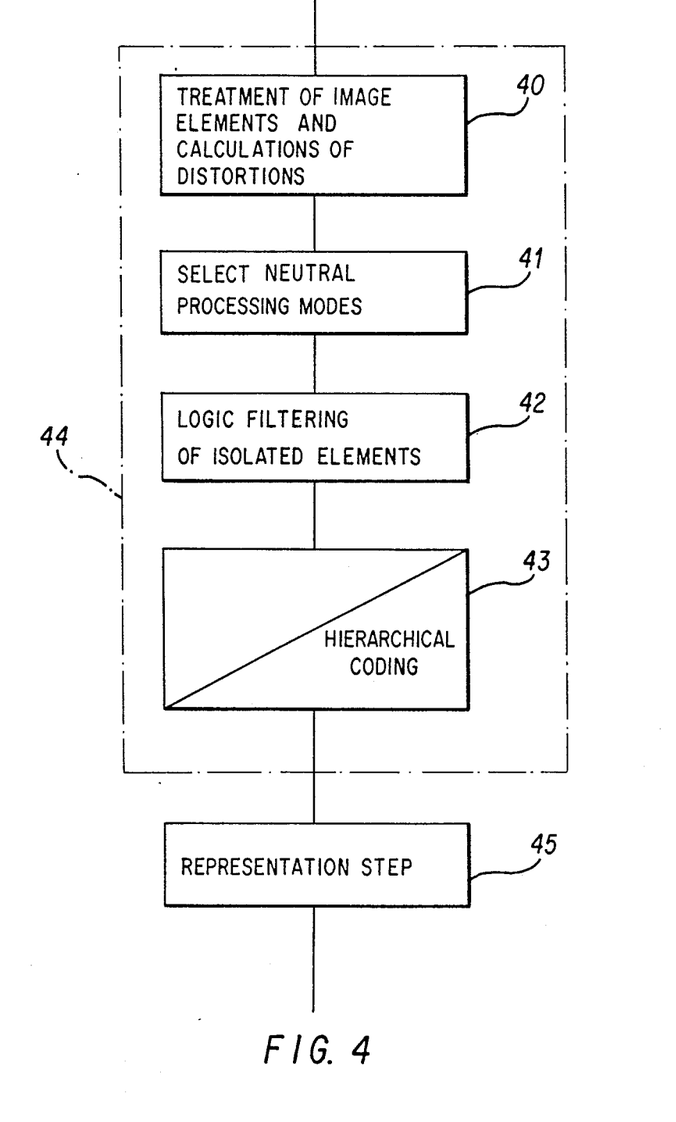
FIG. 4 illustrates the sequence of steps of a preferred embodiment of the throughput rate reduction method according to the present invention.

FIG. 4 shows the sequence of steps of the method according to the invention, that is:
  the method is initialized using distortion values associated with the different available processing modes, performed in parallel, for each picture element 40;
  then, from among all the picture elements, those elements that may be considered to accept, without discrimination, at least two distinct processing modes 41, are determined;
  if necessary, a logic filtering operation 42 is performed to eliminate isolated picture elements in the picture;
  the filtering operation 43 is performed to select the final processing mode associated with the neutral elements, in relation with a hierarchical encoding procedure enabling the optimization of the reduction in throughput rate;
  finally, the representation 45 of the picture elements is made, for the purpose of dispatching the corresponding identifiers.

The steps 40 to 43 correspond to the operation 44 for the reduction of the throughput rate proper, preceding the representation step 45.

For the embodiment described here, at the step 40, each of the three processing modes available (still zone, mean motion, fast motion) is performed in parallel on the original HD picture. Each of these processing modes essentially consists in a prefiltering of the picture, a sub-sampling adapted to the motion related to each processing mode, and a reconstruction of the picture.

The choice of the processing mode is then made on the pictures reconstructed, at the encoder, by comparison with the original picture.

This choice is made, for example, on picture elements each formed by a block of four points by four rows in each of the frames of the high definition picture. For each of the processings, the maximum error of reconstruction on the 4×4 block is computed (distortion between the picture source and the sub-sampled picture, before or after reconstruction). Several known methods for the computation of distortion in a block can be used, for example, of the DFD type (Walker and Rao). The chosen processing mode is the one which minimizes this error.

An object of the step 41 is to select neutral processing mode picture elements.

In an HDMAC application, sending a piece of information on the choice of processing mode for each 4×4 block would result in an excessive throughput rate as compared with the one permitted.

Furthermore, the number of blocks in the picture (especially in the uniform zones) can be processed without damage according to any one of the three processing methods.

In order to reduce the throughput rate, a definition has thus been made of blocks that are "neutral" with respect to the processing operation that they will undergo. These are blocks such that the difference between the maximum reconstruction error, according to two different modes of processing, is below a certain threshold (which is fixed, for example, empirically at about 5 units on the scale 0–255, on the basis of the dispatches made). These blocks will be chosen on an a posteriori basis as being processed according to either of the two modes of processing so as to reduce the throughput rate of the information on the choice of processing.

It should be noted that the modification of the "neutral" blocks into non-neutral blocks will be closely related to the method for encoding (representing) the information used.

In short, the following are thus defined in the picture:
  blocks processed according to the "still zone" processing mode (B1 type blocks);
  blocks processed according to the "mean motion" processing mode (B2 type blocks);
  blocks processed according to the "fast motion" processing mode (B3 type blocks);
  blocks that are "neutral" between the "still zone" mode and the "mean motion" mode (type I1 blocks);
  blocks that are "neutral" between the "mean motion" mode and the "fast motion" mode (I2 type blocks).

There are no "neutral" blocks between the "still zone" mode or the "fast motion" mode.

Step 42 corresponds to a logic filtering of the isolated elements (blocks). Many decisions (and, hence, of blocks to encoded) do not correspond to a piece of information on significant motion (the isolated blocks in particular) and thus greatly encumber the throughput rate. These blocks can therefore be eliminated by a median filtering operation.

Figure 6:
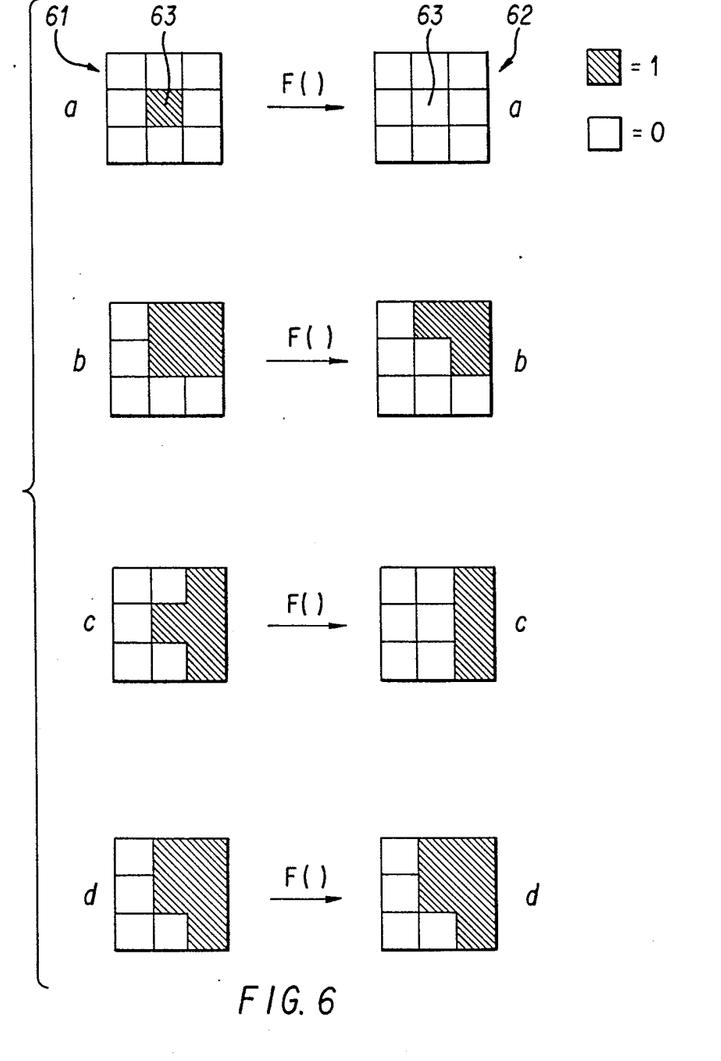
FIG. 6 gives a schematic view of the implementation of a filtering operation to eliminate isolated picture elements, in the simple case where there are two available processing modes.

As shown schematically in FIG. 6, the medium of the filter 61 is three blocks horizontally by three blocks vertically.

In the embodiment of FIG. 6, a case is shown of filtering of isolated blocks, applied to a multiprocessing system with only two processing modes available. The first processing mode 1 is shown schematically by a black box, representing a block for which the processing mode chosen by minimizing the sub-sampling distortion is, for example, that of filtering for a "still zone". The blank blocks, therefore, correspond to a preferred processing mode according to a "mobile zone" mode. In the embodiment shown, the filtering function F() consists in considering the central block 63 of the filter 61 to be isolated when there are at least four neighbours of the same nature (still or mobile). In this case, an isolated still block becomes a mobile block 61A, 61B, 61C, or vice versa. The box 61D corresponds to a maintaining of the fixed nature of the central block.

In the case of the application of this principle of filtering to a multiprocessing system with three available processing modes, one embodiment (not shown) may consist in the classification of all the processing modes, on these nine blocks, in the following order: "still zone" B1, "neutral block" I1, "mean motion" B2, "neutral block" I2, "fast motion" B3. The median value (i.e., a fifth of the nine classified values) is then chosen as a new value of the central block.

This filter has the effect of eliminating the isolated blocks, (i.e. those for which the information relating to choice is different from that of the neighbouring blocks) in replacing them by the piece of information which is locally in the majority. In particular, it has the effect of converting the isolated blocks with determined motion ("still zone", "mean motion", "fast motion") into blocks of any motion in the uniform zones of the picture.

Step 43 of FIG. 4 corresponds to the filtering of the "neutral" blocks, that is, it corresponds to the final determination of the processing mode assigned to these blocks.

So as to reduce, to the maximum extent, the throughput rate of the information relating to choice, which has to be transmitted, the filtering of the neutral blocks should be related to the encoding method used, i.e. in the present case, hierarchical encoding.

The principle of hierarchical encoding implies the encoding of homogeneous information blocks of variable size (for example, four points by four rows up to sixteen points by sixteen rows), with the number of bits describing a 16×16 block being smaller than one describing a 4×4 block. Hence, it is important, when filtering the neutral blocks, to create the greatest possible number of 16×16 sized having a homogeneous item of information on motion. For this, the logic filter which eliminates the neutral blocks will have a medium of a size that can vary from 16×16 to 4×4.

Figure 5A:
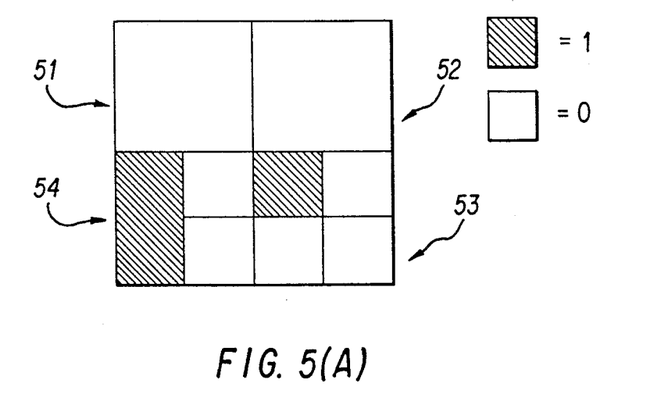
FIGS. 5A and 5B illustrate the implementation of a hierarchical encoding method, by "quadtree", for the step of selecting the optimum processing for the neutral processing mode picture elements.
Figure 5B:
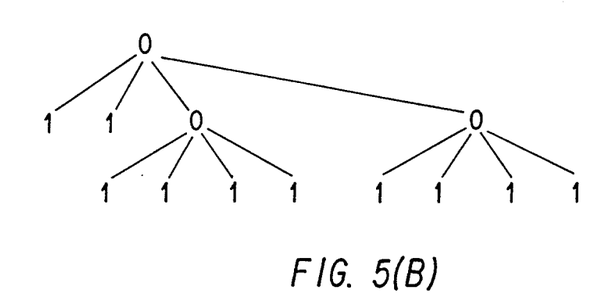

FIGS. 5a, 5b illustrate an advantageous mode of implementation of the hierarchical encoding method, in "quadtree" form, in the case of a multiprocessing system with two available processing modes (still and mobile).

The 16×16 size block 50 is heterogeneous It is split up into four 8×8 sub-blocks (51, 52, 53, 54). The sub-blocks 51, 52 are homogeneous and can therefore be encoded at this level. On the contrary, the sub-blocks 53, 54, are heterogeneous: they should thus both be split up into elementary 4×4 blocks.

The arborescent diagram shown in FIG. 5b illustrates the breakdown; it can be seen that the 16×16 zone can be described by 10 bits (two 8×8 blocks and eight 4×4 blocks), instead of 16 bits if it were desired, at the very outset, to describe each 4×4 block on the entire 16×16 zone.

In the case of a multiprocessing system with three available processing modes, the filtering method is as follows:
1. Initial 16×16 medium (namely, the grouping together of 16 blocks with a 4×4 size);
2. If the information on choice is homogeneous (all the blocks have an identical piece of information on motion) and significant ("still zone", "mean motion" or "fast motion"): then end of filtering of blocks in the medium considered;
3. If the information on choice is homogeneous but neutral, the I1 type blocks are modified into "mean motion" blocks and the I2 type blocks are modified into "fast motion" blocks;
4. If the information is heterogeneous but coherent, (neutral blocks and blocks of corresponding motion):
   (a) "still zone" type blocks B1 and neutral blocks I1: the I1 type blocks are modified into B1 type;
   (b) "mean motion" type blocks B2 and neutral type blocks I1 or I2: the "neutral" type blocks are modified into type B2 blocks;
   (c) "fast motion" B3 type blocks and "neutral" I2 type blocks: the "neutral" type blocks are modified into type B3 blocks.
5. If the information on choice is heterogeneous and incoherent (all the other cases): the medium of the filter is divided by 4, and it therefore becomes a medium with 8 points by 8 rows. The process is then iterated from the step 2 onwards (with, if necessary, a new division by 4 of the medium of the filter).

It must be noted that, when only "neutral" blocks are within the boundaries of the filter medium, the choice is advantageously modified by favoring the "mean motion" mode over the "still zone" mode and the "fast motion" mode over the "mean motion" mode in order to give preference, in critical cases, a fuzzy effect which is less troublesome than other possible artifacts.

It will also be noted that it is preferably to perform the median filtering before the filtering of the "neutral" zones for one main reason: the 4×4 blocks of information on non-neutral choice in a "neutral" zone is eliminated whereas the reversal of the operations would cause an increase in its size. This enables the elimination of small zones of non-significant choice instead of giving them excessive importance.

The method for reducing the throughput rate is perfectly capable of being adapted to all sorts of techniques for the management of the compression of the main picture data, notably with picture skipping, frame skipping and similar techniques. Thus, in order to reduce the temporal switchovers of processing choices which are visually very troublesome, a temporal enforcing can be done on the processing choice decisions: this also makes it possible, as the case may be, to reduce the throughput rate.

For example, a temporal enforcing done on a set of four frames would make it possible to go from a piece of information relating to choice, transmitted at 50 Hz, to a piece of information relating to choice, transmitted at 12.8 Hz.

Furthermore, it must be noted that a piece of information on choice which is stable on four frames is indispensable to obtain a good reconstruction of the still zones of the image.

Advantageously, the enforcing used for a multiple processing system with three available processing modes is thus the following: the information relating to choice on four consecutive frames is considered for all the elementary blocks of four points by four rows. If, on one of the four frames, the block is processed by the "fast motion" mode, it is processed on all four frames. If not, if on one of the frames, the block is processed according to the "mean motion" mode, it is processed in this mode all four frames. Finally, in the latter case, it is processed in "still zone" mode on all four frames.

FIGS. 7 to 12 corresponding to an advantageous embodiment of a sequential operation module for the implementation of the assistance data throughput rate reduction method according to the present invention.

This module corresponds to a multiprocessing system with three available processing modes.

The picture elements are blocks of four points by four rows in the frame.

The representation step 45 (FIG. 4) is achieved by "quadtree" on the blocks of 4×4 picture elements (16×16 picture points).

Figure 11:
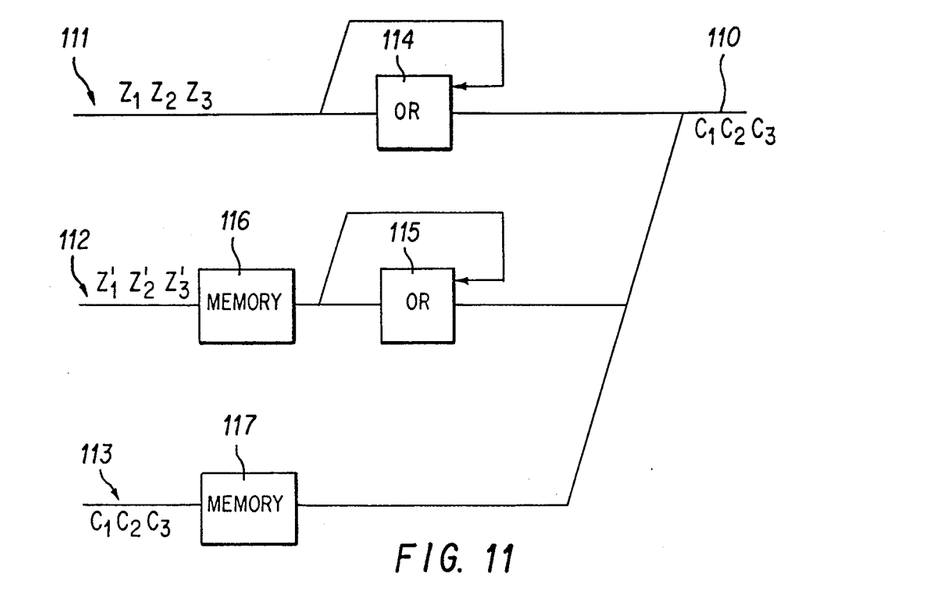
Figure 12:
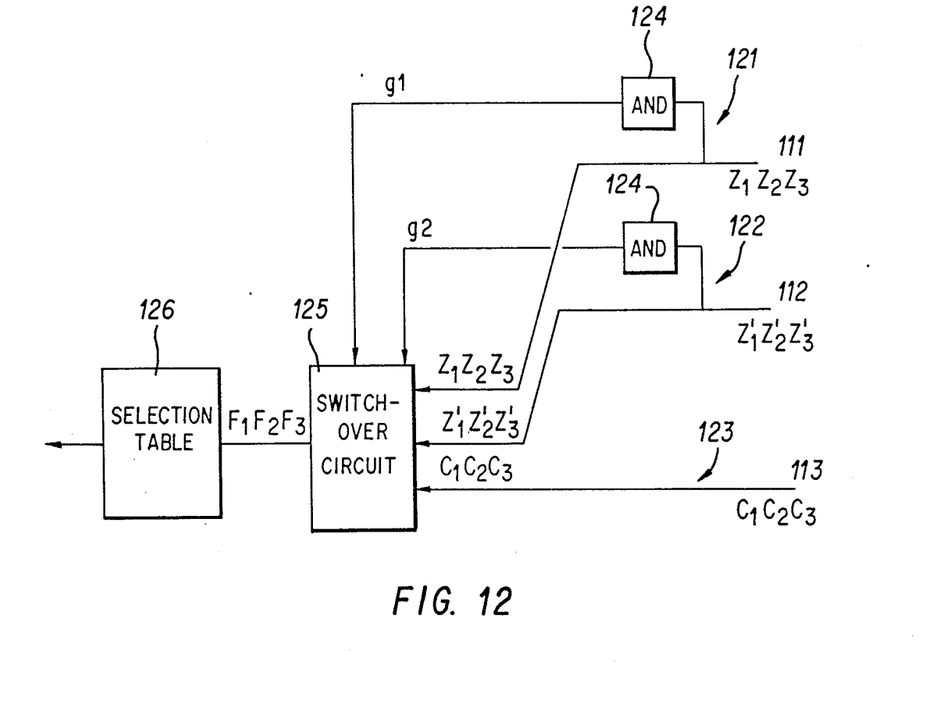

This preferred module has the following sub-modules:

a first sub-system 41 for the determination of picture elements with neutral processing modes, comprising:
    a sub-module for the computation of bits for the classification of the three processing modes, for each picture element (FIG. 7);
    a sub-module for the computation of processing equivalence bits, among the three processing modes available, taken two by two, for each picture element (FIG. 9);
    a table for the computation of neutral processing bits (FIG. 9b) using classification bits and processing equivalence bits;

a second sub-system 43 for the filtering of the neutral elements, with hierarchical encoding, comprising the following two sub-modules;
    a sub-module for the computation of three series of processing homogeneity bits on the blocks of 4×4 picture elements, 2×2 picture elements and 1×1 picture element for the implementation of the hierarchical encoding (FIG. 11);
    a sub-module for the computation of final processing bits as a function of processing homogeneity bits, at each level of the hierarchical encoding (FIG. 12).

Figure 7:
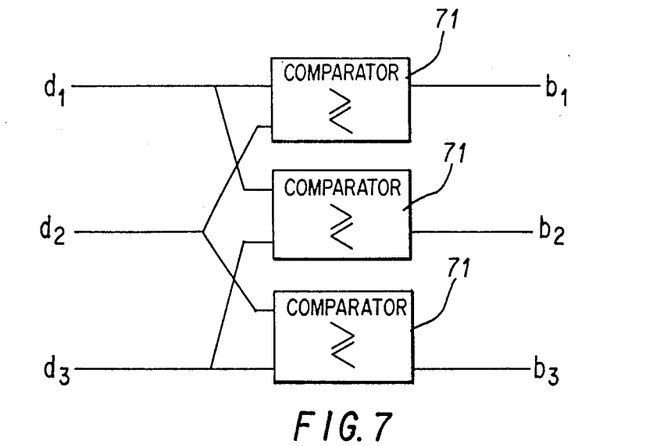

The module of FIG. 7 enables the computation of the classification bits b1, b2, b3, on the basis of the distortions d1, d2, d3 respectively introduced by each processing operation as compared with the original image.

The salvo of bits b1, b2, b3, output from the module of FIG. 7, gives an order of classification of the processing operations on three bits, b1, b2, b3, according to the following algorithm:

| if d1 ≦ d2 | b1 = o | else b1 = 1 |
|---|---|---|
| if d1 ≦ d3 | b2 = o | else b2 = 1 |
| if d2 ≦ d3 | b3 = o | else b3 = 1 |

The method for the computation of the input values of distortion $d_1 \ldots d_N$ is not a restrictive characteristic of the invention; for example, it could be the luminance deviation DFD.

For the N values of distortion $d_i$ at input, the sub-module of FIG. 7 gives $N.(N-1)/2$ values of classification bits $b_i$ at the output of as many comparator circuits 71.

Figure 8:
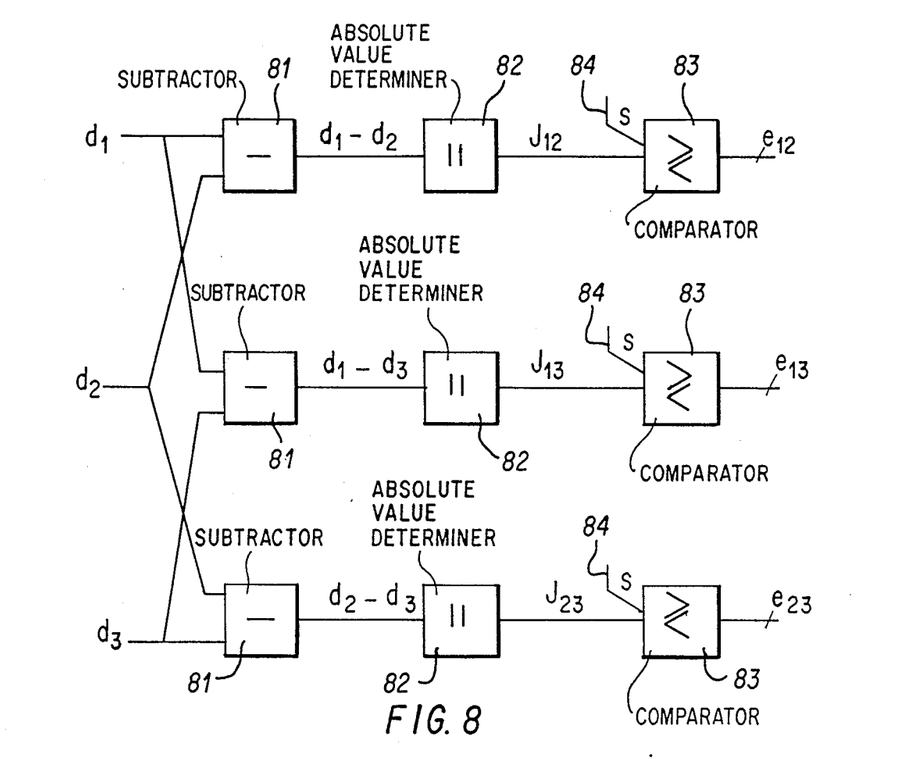

The sub-module of FIG. 8 gives a schematic view of the obtaining of processing equivalence bits $e_{ij}$, using distortion values $d_1 \ldots d_N$. In the same way as for the classification bits $b_i$ of the sub-module of FIG. 7, the equivalence bits $e_{ij}$ are computed for the $N.(N-1)/2$ pairs of distortion that can be formed from the N distortions $d_i$ in input values.

The sub-module of FIG. 8 successively comprises a set of subtractor circuits 81 used to compute the differential distortion values $(d_1 - d_2, d_1 - d_3, \ldots)$ then a set of circuits 82 for the obtaining of the absolute value of the differential distortions. The deviations between the distortions thus obtained are thus are finally introduced into a set of comparator circuits 83 which also allows, at input, a threshold value 84. The bits $e_{ij}$ at the output of the module verify the following algorithm:

$e_i=0$, if $J_{ij} \leq S(J_{ij}=d_i-d_j)$: the processing operations $T_i$ and $T_j$ are equivelant for the picture element considered.

$e_{ij}=1$ else

FIG. 9a gives a schematic view of the computation chain to compute the relevance processing bits $c_1c_2c_3$ using input values consisting, firstly, of functional arrangement bits b1 b2 b3 and, secondly, equivalence bits $e_{12}e_{13}e_{23}$.

Each of the bits $c_i$ indicates whether the corresponding processing operation $t_i$ is relevant and acceptable for the current picture element. The salvo of bits $c_1c_2c_3$ thus makes it possible to ascertain that the picture element is neutral among several of the available processing modes according to the following algorithm:

if $c_1=0$, the picture element can be processed by the processing mode $T_i$.

If $c_i=0$ and $C_j=0$, the picture element is neutral between the processing modes $T_i$ and $T_j$;

If $c_i=0$ and $c_j=1$ for $j \neq i$, then the picture element is not neutral. Its associated processing mode is the processing mode $T_i$.

The table of FIG. 9b gives the correspondence between the input values and the output values of the sub-module of FIG. 9A. The darkened boxes of the table correspond to logically impossible situations.

It will be ascertained that the value of each relevance bit is equal to 0 (acceptable processing) when the associated processing mode meets both a condition of minimum distortion as compared with the other available, non-neutral processing modes (arrangement bits), and provided that there is a distortion deviation, with set thresholds, from each of the other neutral processing modes (equivalence bits).

The equivalence bits are then introduced into the module 43 for the filtering of neutral elements, with the operation of hierarchical encoding. If necessary, the picture elements are previously subjected to logic filtering for the elimination of isolated elements (42).

The hierarchical encoding operation entails the assumption that the information relating to the medium of the filter, namely blocks of 4×4 picture elements, are memorized.

Figure 10A:
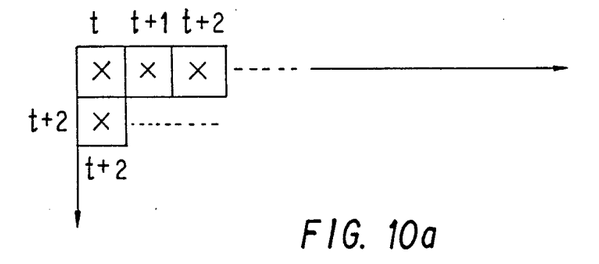
FIGS. 10A, 10B, 11, and 12 illustrate an advantageous embodiment to implement a sequential operation of the step for determining processing choices, for the neutral picture elements, compatible with the embodiment of FIGS. 7 to 9B.

FIG. 10A illustrates the order of exploration of the picture elements in the source picture. t+2 corresponds to a delay of one picture element row.

Figure 10B:
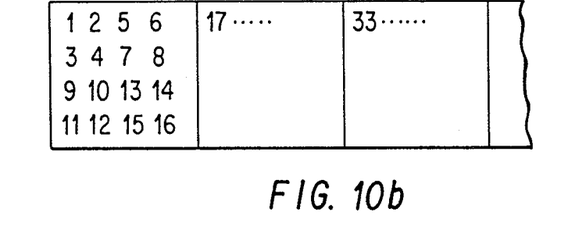

For the filtering operation of the neutral elements, and hence, for the enforcing of the final processing chosen for each picture element with neutral processing modes, the re-reading of the memory is done in the order shown in FIG. 10B, on 4×4 element blocks. The associated memory contains the processing relevance information for each picture element, namely, the salvos of relevance bits $c_1c_2c_3$.

The salvos $c_1c_2c_3$ can, in effect, assume two types of values:
 values with a single relevant processing mode which will therefore be the final processing chosen ($c_1c_2c_3$=011, 101, 110);
 values with several relevant processing modes, between which a final processing mode has to be chosen by filtering ($c_1c_2c_3$=000, 001, 010, 100).

FIG. 11 shows the sub-module for parallel exploration, in three branches 111, 112, 113, of the possibility of combining picture elements into homogeneous 4×4, 2×2 blocks or simply 1×1 homogeneous blocks respectively.

In the branch 111, the salvos $c_1c_2c_3$ give, at 16 clock beats, one salvo of values $z_1z_2z_3$ representing the homogeneity of the current 4×4 block by means of the OR circuit 114.

Ech of the bits $Z_i$ is computed in the form:

$$z_i = U(c_i) t = 1 \text{ to } 16.$$

Thus, if $z_i=0$ all the picture elements of the 4×4 block can be processed by the processing mode $T_i$.

The branch 112 performs a similar computation by means of the OR circuit 115, on each current 2×2 block.

Each of the bits of the salvo $z'_1z'_2z'_3$ results from the logic operation:

$$z'_i = U(C_i) t = 1 \text{ to } 4;$$

Thus, if $z'_i=0$ all the elements of the current 2×2 block can be processed by the processing mode $T_i$.

Each of the salvos $z'_1z'_2z'_3$ of one and the same 4×4 block is memorized in a memory 116 with four values.

The branch 113 memorizes, in a memory of 16 values 117, the salvos of relevance bits $c_1c_2c_3$, associated with each of the picture elements of the current 4×4 block.

The three series of salvos 111, 112, 113, coming from the sub-module of FIG. 11, are exploited in the sub-module of FIG. 12, ensuring the decision on the final processing bits $f_1f_2f_3$ for the current block or current picture element.

The salvo $f_1f_2f_3$ is selected by the switchover circuit 125 from the three input salvos $z_1z_2z_3$, $z'_1z'_2z'_3$, $c_1c_2c_3$. The selection criterion is formed by the two selection data $g_1$, $g_2$, defined as follows:

$$g_1 = z_1 \cdot z_2 \cdot z_3$$

$$g_2 = z'_1 \cdot z'_2 \cdot z'_3$$

These two pieces of selection information are obtained by means of the AND circuit 124 placed on each of the two arms 121, 122, at the input of the sub-module.

When $g_1$ or $g_2$ is null, it means that there is a processing mode common to all the elements of the 4×4 or 2×2 current block respectively.

The switching-over operation performed by the circuit 125 then works according to the following algorithm:

If $g_1=0$, at the switching-over output we have:

$$f_1f_2f_3 = z_1z_2z_3$$

if $g_1=1$ and $g_2=0$, at the switching-over output we have:

$$f_1f_2f_3 = z'_1z'_2z'_3$$

if $g^1=1$ and $g_2=1$, at the switching-over output we have:

$$f_1f_2f_3 = c_1c_2c_3$$

The table of choice 126 finally attributes the choice of processing mode to the picture elements according to the following table I.

TABLE I

| $f_0f_1f_2$ | Output | |
|---|---|---|
| 011 | 011 | →(processing 1) |
| 101 | 101 | →(processing 2) |
| 110 | 110 | →(processing 3) |
| 001 | 011 | |
|  | or 101 | |
| 010 | 011 | |
|  | or 110 | |
| 100 | 101 | |
|  | or 110 | |
| 000 | 011 | |
|  | or 101 | |
|  | or 110 | |

The method according to the invention has been tested under the following conditions.

The encoding method used to reduce the throughput rate of information on choice is the hierarchical encoding method, applied to blocks, the size of which varies between 16 points by 16 rows and 4 points by 4 rows (the picture element therefore has a size of 4×4 points).

The hierarchical encoding therefore describes the picture in a certain number of blocks of variable sizes (4×4 up to 16×16), each of the blocks containing a piece of information on the choice of homogeneous processing mode. Since there are three possible processing modes, this information on choice is encoded herein on two bits for each block.

The total throughput rate is therefore broken down into two: the part of the throughput rate is devoted to the segmentation of the picture, while the other is devoted to the information on choice proper.

On the tested sequences, the distribution is about one third for the segmentation against two thirds for the choice.

In the case of a chain with three modes, the information relating to choice of processing mode has the following characteristics:

this information is transmitted at 12.5 Hz (4 consecutive frames having the same information on choice of processing mode);

it is encoded by an hierarchical algorithm (quadtree) which splits up the picture into blocks of variable size (segmentation of the picture). For each of the blocks, a piece of information relating to choice (on two bits) is transmitted.

the throughput rate obtained is smaller than 160 kbits/s for high definition pictures.

What is claimed is:

1. A method for the reduction of the throughput rate of a sequence of data for assistance in the reconstruction of an electronic picture from a sub-sampled source signal, notably a sequence of data for the selection of sub-sampled electronic picture, wherein the sub-sampling processing used for each picture element comprises associating an optimum processing mode chosen from among several available processing modes tested in parallel, the efficiency of each processing mode being measured by a criterion of distortion of the processed signal with respect to the source signal, the method comprising the steps of:

selecting within the picture or picture image blocks, neutral processing mode picture elements said neutral processing mode picture elements being picture elements capable of accepting, without discrimination, at lest two distinct sub-sampling neutral processing modes;

associating to each of said neutral processing mode picture elements, one of said neutral processing modes wherein said one neutral processing mode enables an optimal reduction in the throughput rate of the assistance data.

2. A method according to claim 1 wherein, in said step of selecting neutral processing mode picture elements, a search is made, with respect to each picture element, for a set of neutral processing modes, among the available processing modes, such that each of the processing modes, belonging to said set of neutral processing modes, meets both a condition of minimal distortion with respect to other available non-neutral processing modes not belonging to said set of neutral processing modes, and a condition of a distortion deviation, having a set threshold, with each of the other neutral processing modes.

3. A method according to claim 2, wherein said step of selecting neutral processing mode picture elements comprises the step of:

arranging said available processing modes by order of increasing distortion of the processed signal with respect to the source signal;

determining, among all the pairs of processing modes that can be formed among said available processing modes, those pairs for which the distortion deviation, in terms of absolute value, is below a given acceptable threshold;

determining, from among said available processing modes, the relevant modes defined as being the first processing modes in the increasing order of distortion which present, in sets of two, a distortion deviation which is smaller than said given acceptable threshold;

said relevant processing modes being said to be neutral when their number is at least two.

4. A method according to claim 2, wherein said step of selecting picture elements with neutral processing modes comprises the step of associating, with each of the processing pairs that can be formed from among all the processing operations available for the picture element, an arrangement bit, said arrangement bit, associated with each of the said pairs of processing modes available, assuming a first value when the first processing of the pair results in a distortion smaller than the second processing, and a second value otherwise; and a processing equivalence bit, said equivalence bit associated with each of said pairs of available processing modes assuming a first value when the distortion deviation, in absolute value, between the two processing modes of the pair is smaller than a given acceptable threshold, and a second value otherwise, and wherein the method further comprises the step of subsequently reading, from a table, a processing relevance bit associated with each processing mode, as a function of the combination of values of the arrangement bits and the equivalance bits particular to said picture element.

5. A method according to claim 1, wherein said step of associating an optimal processing mode to each of said neutral processing mode picture elements comprises the step of hierarchical encoding on picture blocks of said picture, said picture blocks being formed by $n \times m$ picture elements, said step of hierarchical encoding comprises the steps of attempting to select a single, representative processing mode which is unique for all the picture elements of said picture block by exploring all the processing modes acceptable by the neutral processing mode picture elements and then, if there is no single, representative mode for said picture block, dividing said block iteratively until subblocks with single, representative processing are brought out therefrom.

6. A method according to claim 5, wherein there are defined three available sub-sampling processing modes, B1, B2, B3, allowing two distinct types of picture elements with neutral processing modes I1, I2, and wherein said step of hierarchical encoding is applied to an initial block of $n \times n$ elements and comprises the following steps:

if the processing mode associated with all the $n \times n$ elements is homogeneous and significant, said processing mode is associated with the entire block;

if the processing mode associated with all the $n \times n$ elements is homogeneous but neutral, the type I1 picture elements are enforced to B2 and the type I2 picture elements are enforced to B3;

if the processing modes associated with all the picture elements of the block are heterogeneous but coherent, the picture elements with neutral processing modes I1, I2 are enforced according to the type of processing, B1, B2, B3, of the other picture elements of the block; and if the processing modes associated with all the picture elements of the block are heterogeneous and incoherent, said block of picture elements is divided iteratively until sub-blocks with single, representative processing are brought out therefrom.

7. A method according to claim 1, further comprising the step of filtering the picture to eliminate isolated picture elements, said filtering step comprising the steps of sweeping the sub-sampled picture with a mobile filtering window with a size of n×m picture elements, and modifying the sub-sampling processing operation associated with at least one central picture element for each position on the picture of the mobile window, should the processing mode associated with said central picture element be different for at least one of the processing modes chosen from among the following:

a majority processing mode, and a mean processing mode associated with the other picture elements inside said window.

8. A method according to claim 7, wherein said step of filtering for the elimination of isolated blocks is applied to a sub-sampling system comprising three distinct processing modes B1, B2, B3 the picture elements being further capable of taking two types I1, I2, of neutrality with respect to processing mode, wherein, within said filtering window, all the processing modes associated with the picture elements of the window are classified in a list in respect to the order B1, I1, B2, I2, B3, and wherein the processing mode associated with the central picture element of the window the processing mode associated with the central picture element of the window is enforced at the median value of said classified list of processing modes in the window.

9. A method according to claim 6 or 8, wherein the processing modes B1, B2, B3 correspond to a sub-sampling processing operation for still pictures, slow motion pictures and fast motion pictures respectively, and wherein said I1, I2 type picture elements are neutral as regards the processing of still/slow motion pictures and slow motion/fast motion pictures respectively.

10. A method according to claim 7, wherein said step of filtering for the elimination of isolated blocks in performed before the step of associating optimal processing modes to the blocks with neutral processing modes.

11. A method according computations being achieved on the whole of the said n×n pixels, n being an integer ≧1, the distortion computations being achieved on the whole of the said block.

* * * * *

UNITED STATES PATENT AND TRADEMARK OFFICE
CERTIFICATE OF CORRECTION

PATENT NO. : 4,951,138
DATED : 21 August 1990
INVENTOR(S) : Jean-Pierre HENOT It is certified that error appears in the above-identified patent and that said Letters Patent is hereby corrected as shown below:

| Column | Line | |
|--------|------|---|
| 1 | 40 | change "a HDTV" to --an HDTV--. |
| 2 | 38 | Change "done a a priori" to --done a priori--. |
| 2 | 40 | Change "a posteriori" to --a posteriori--. |
| 3 | 42 | Before "provide" insert --to--. |
| 3 | 52 | Change "an mode" to --a mode--. |
| 4 | 3 | After "signal," insert paragraph. |
| 4 | 38 | Change "block said" to --said block--. |
| 7 | 5 | Before "encoded" insert --be--. |
| 7 | 27 | Change "vice versa" to --vice versa--. |
| 8 | 3 | After "heterogeneous" insert --.--. |
| 8 | 24 | After "medium" insert --is--. |
| 9 | 22 | After "mode" insert --all--. |
| 9 | 24 | Change "corresponding" to --correspond--. |
| 9 | 57 | Before "1 X 1" insert --a--. |
| 10 | 29 | After "thus" delete "are". |
| 11 | 38 | Change "Ech" to --Each--. |

UNITED STATES PATENT AND TRADEMARK OFFICE
CERTIFICATE OF CORRECTION

PATENT NO. : 4,951,138

DATED : 21 August 1990

INVENTOR(S) : Jean-Pierre HENOT

It is certified that error appears in the above-identified patent and that said Letters Patent is hereby corrected as shown below:

| Column | Line | |
|---|---|---|
| 12 | 18 | Change "$_I$f" to --If--. |
| 12 | 23 | Change "if" to --If--. |
| 12 | 59 | Change "the part" to --one part--. |
| 13 | 25 | After "blocks" delete the comma. |
| 13 | 26 | After "elements" insert --,--. |
| 13 | 50 | Change "step" to --steps--. |
| 15 | 12 | Change "mean" to --means--. |
| 16 | 16 | Change "in" to --is--. |

UNITED STATES PATENT AND TRADEMARK OFFICE
CERTIFICATE OF CORRECTION

PATENT NO. : 4,951,138

DATED : 21 August 1990

INVENTOR(S) : Jean-Pierre HENOT

It is certified that error appears in the above-identified patent and that said Letters Patent is hereby corrected as shown below:

| Column | Line | |
|---|---|---|
| 16 | 19-22 | Delete entirely and insert the following: --11. A method according to claim 1, wherein said picture element is a block of n x n pixels, n being an integer $\geq$ 1, the distortion computations being achieved on the whole of the said block.--. |

Signed and Sealed this

Seventh Day of January, 1992

*Attest:*

HARRY F. MANBECK, JR.

*Attesting Officer*     *Commissioner of Patents and Trademarks*